Patented Aug. 11, 1925.

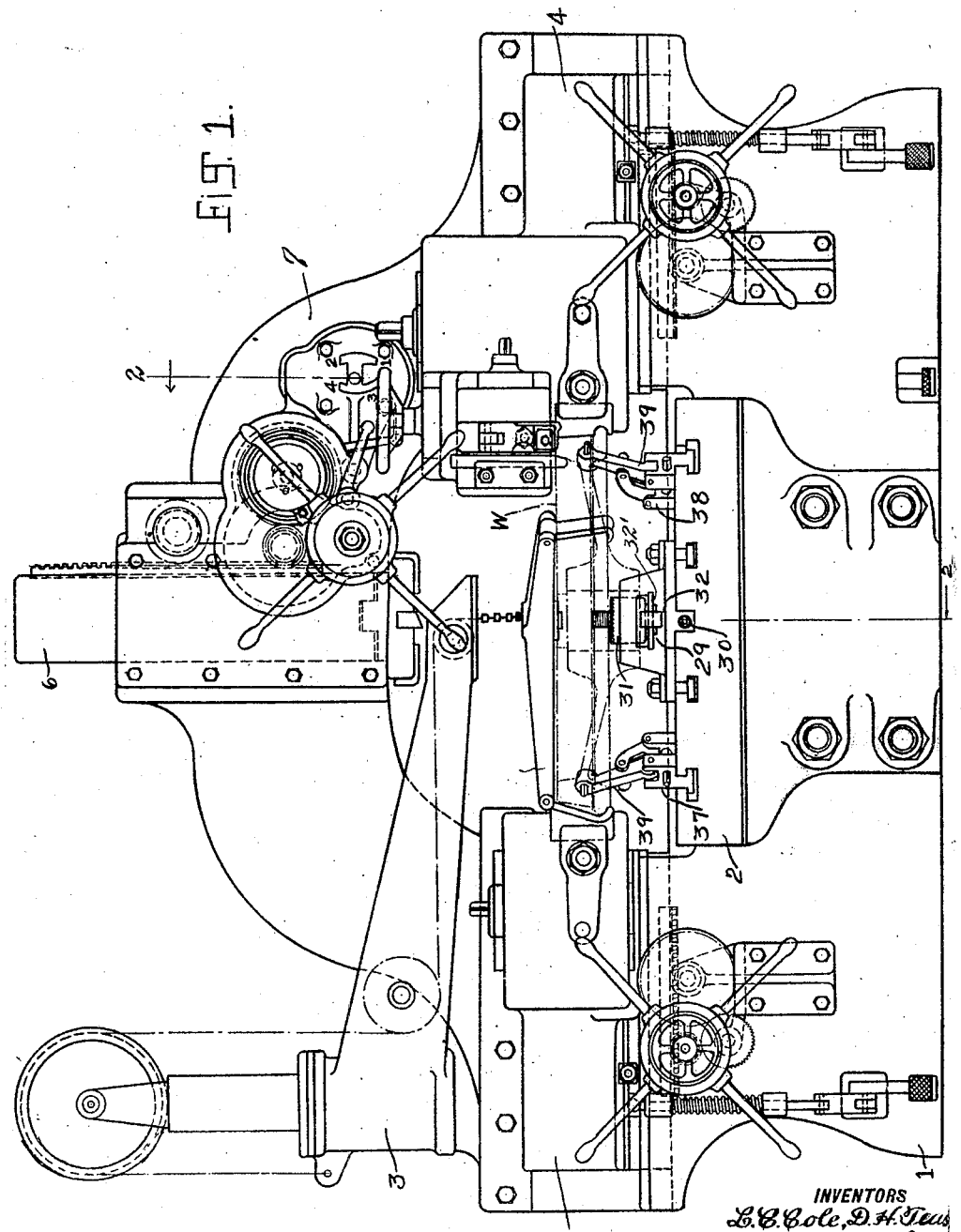

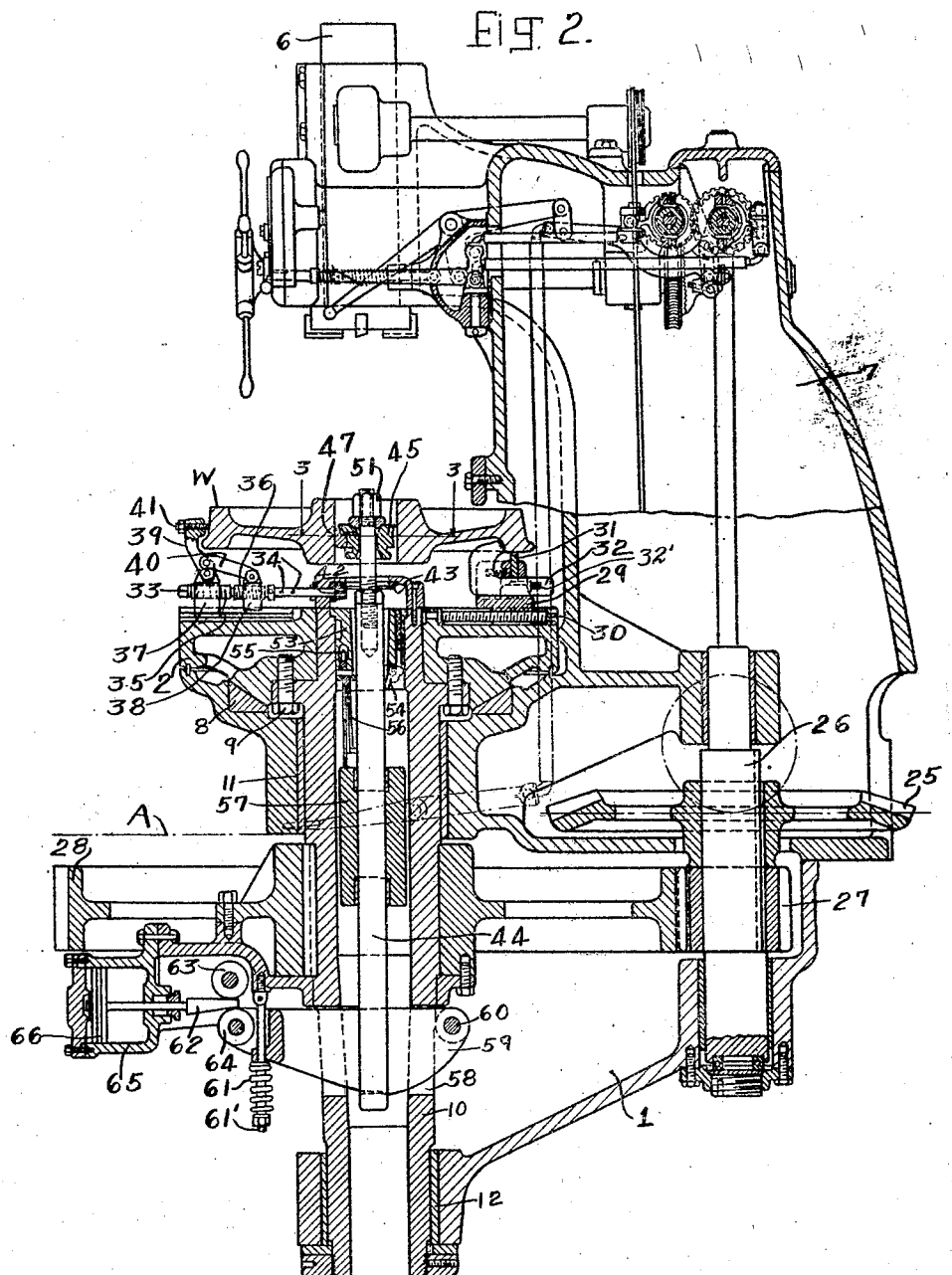

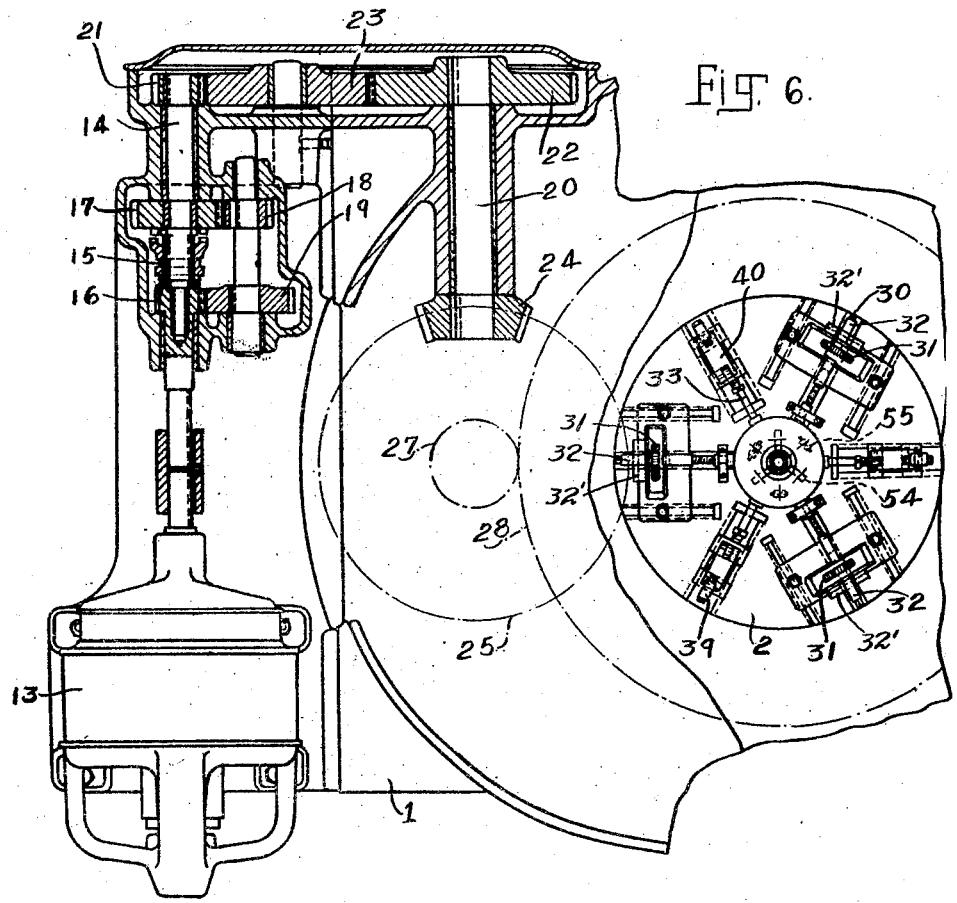

1,549,452

UNITED STATES PATENT OFFICE.

LYNDON C. COLE, OF HAMILTON, OHIO, DANIEL H. TEAS, OF CHICAGO, ILLINOIS, AND JOHN J. FISHER, OF HAMILTON, OHIO, ASSIGNORS TO NILES-BEMENT-POND COMPANY, OF NEW YORK, N. Y., A CORPORATION OF NEW JERSEY.

CAR-WHEEL LATHE.

Original application filed April 22, 1922, Serial No. 556,024. Divided and this application filed October 20, 1923, Serial No. 669,727. Renewed February 17, 1925.

*To all whom it may concern:*

Be it known that we, LYNDON C. COLE, DANIEL H. TEAS, and JOHN J. FISHER, citizens of the United States, residing, respectively, at Hamilton, in the county of Butler and State of Ohio, at Chicago, in the county of Cook and State of Illinois, and at Hamilton, in the county of Butler and State of Ohio, have invented certain new and useful Improvements in Car-Wheel Lathes, of which the following is a specification.

This invention relates to machine tools and particularly to a vertical car wheel lathe of the type illustrated in the accompanying drawings. The machine, as illustrated, is particularly adapted for turning the contour of the tread and flange and facing the hub and rim on the side opposite the flange of rolled steel car wheels. The machine illustrated is adapted to perform these operations simultaneously. The primary object of the invention is to provide an improved machine for performing the functions stated.

This application forms a division of our application Serial No. 556,024, filed April 22, 1922.

It is an object of the invention to provide an improved work centering mechanism in connection with the work table of the machine whereby the work may be accurately centered before being clamped to the table.

It is another object of the invention to provide improved work securing means in connection with work table and the driving dogs thereon, such means extending axially of the work table and being adapted to draw the work into tight engagement with the driving dogs on the table.

Another object of the invention is to provide a work engaging device comprising a bushing having a plurality of serrated jaws therein, the device being adapted to be mounted within a bore in a work piece with the jaws in engagement with the walls of such bore.

With the above and other objects in view, our invention consists in the features of construction and operation set forth in the following specification and illustrated in the accompanying drawings. In such drawings annexed hereto and forming a part of this specification, we have shown certain embodiments of our invention in a vertical car wheel lathe but it will be understood that the invention can be otherwise embodied and that the drawings are not to be construed as defining or limiting the scope of the invention, the claims appended to this specification being relied upon for that purpose.

Referring to the figures of the drawings:

Figure 1 is a front elevation of a vertical car wheel lathe comprising our invention.

Fig. 2 is a vertical sectional view therethrough approximately on line 2—2 of Fig. 1.

Fig. 3 is a cross sectional view through the work engaging device, taken on line 3—3 of Fig. 2.

Fig. 4 is an enlarged longitudinal sectional view thereof on line 4—4 of Fig. 3.

Fig. 5 is a cross section on line 5—5 of Fig. 4.

Fig. 6 is a plan view of the table, its driving mechanism and the centering mechanism for the work.

A car wheel W of the type to be machined is illustrated in dot and dash lines as mounted on the work table shown in Fig. 1 of the drawings and in full lines in Fig. 2. The hub of the wheel has a hole punched therethrough and a minimum amount of stock is left in the bore and on the hub, tread and flange to permit the proper machining thereof. The wheel may first be bored and brought to the lathe in this condition whereby the wheel would be centered by the finished hole. We prefer, however, to eliminate this operation and have the wheels brought to the lathe directly as they come from the rolling mill. Our machine therefore is adapted to receive the wheel in the rough, to accurately center the same on the work table and to simultaneously machine the flange, tread, side and hub thereof.

Referring to the accompanying drawings, 1 indicates the bed of the machine having a work table 2 rotatably mounted thereon. A pneumatic hoist 3 is provided on the bed at one side thereof for lifting the work W onto the work table. Tool slides 4 and 5 are mounted for horizontal sliding movement on the bed at opposite sides of the table. A tool slide 6 is mounted for vertical sliding movement over the table in a forwardly projecting portion of an arch-shaped column 7 extending upwardly from the rear of the bed.

The bearing surface of the table or face plate 2 is conical and rests on a large annular ring 8. Bolts 9 secure the table to a vertical spindle 10 mounted in upper and lower bearings 11 and 12 in the bed 1. The table is rotated from a motor 13 through the mechanism illustrated in Figs. 2 and 5. A shaft 14 in alignment with the motor shaft has a clutch 15 splined thereon. The shaft 14 may be driven directly from the motor shaft by engaging the clutch 15 with clutch teeth on the end of a gear 16 on the motor shaft. By shifting the clutch 15 in the opposite direction into engagement with clutch teeth on a loose gear 17, the shaft 14 may be driven at a slower speed through the back gears 18 and 19. A shaft 20 is driven from the shaft 14 through gears 21 and 22 on such shafts and an intermediate idler gear 23. A bevel pinion 24 on shaft 20 meshes with a large bevel gear 25 on a vertical shaft 26 at the rear of the machine. The table is driven from the shaft 26 through a pinion 27 on such shaft meshing with a large gear 28 keyed to the spindle 10.

The work table 2 is provided thereon with a plurality of work holding and driving members and a plurality (preferably three) of work centering devices, the centering devices being adapted to accurately center the work prior to its driving engagement with the members. Each driving member comprises a base 29 mounted for radial sliding movement in the table under the action of a screw 30. In each base 29 is mounted a serrated work engaging jaw 31 and a hook clamp 32 for engaging the interior of the work to prevent any lateral slipping thereof. A wedge key 32' is adapted to be driven through a hole in the body portion of each clamp 32 for drawing the clamp into engagement with the work. As shown in Fig. 2, the work driving jaws 31 are adapted to bite the surface of the work facing the table and the work holding jaws 32 are adapted to engage a relatively angular surface of the work to hold the same against lateral movement. A work centering device is preferably arranged between each two adjacent driving members, as illustrated. Each such device comprises a rod 33 mounted radially and for rotation in the spindle 10. Each rod is provided with a plurality of spaced holes 34 therein whereby a sleeve mounted thereon may be secured to the rod in different positions therealong. Each sleeve has two sets of screw threads respectively on opposite ends thereof, one set 35 being of a much greater pitch than the other set 36. Nuts 37 and 38 are mounted respectively on the threaded portions 35 and 36. A work centering element proper 39 is pivoted to the nut 37 and a link 40 connects the element 39 with the nut 38. A work engaging bolt 41 is adjustably mounted in the free end of the element 39. A bevel pinion 42 on the inner end of each rod 33 meshes with a bevel ring gear 43 whereby the rotary adjustment of one of the rods adjusts all the rods simultaneously.

After the work has been properly centered on the table, the same must be held down vertically in contact with the driving jaws 31. For this purpose, we preferably provide a shaft 44 extending axially within the work support. A work engaging device adapted to be secured to the work is adapted to be engaged by the shaft and drawn downwardly to force the work into driving contact with the driving jaws. 45 indicates a conical bushing having three inclined guideways 46 therein in each of which is dove-tailed a serrated work engaging jaw 47. Springs 48 are provided for holding the jaws at the high portions of their inclined guideways whereby the jaws are held in biting contact with the work as hereinafter described. The shaft 44 has an extension 49 threaded into the upper end thereof. A beveled aligning collar 50 and nut 51 are provided for securing the shaft to the bushing 45, the nut and extension 49 being provided respectively with cooperating interrupted threads 52 and 52ᵃ whereby the nut may be quickly mounted on and removed from the shaft.

A bushing 53 is secured axially within the spindle 10 and is provided with means for centering and counterbalancing the shaft 44. It will be noted that the shaft is floatingly mounted in the spindle. Three spring pressed pawls 54 are pivoted to the lower end of bushing 53 about the shaft, such pawls normally acting against the shaft to hold the same axially aligned in the spindle. Pulleys 55 are mounted in the bushing alternately between the pawls 54. A cord 56 extends over each pulley and has the opposite ends thereof respectively secured to the shaft 44 and to a counterbalance weight 57 slidably mounted on the shaft. By this mechanism, the shaft is normally held in a raised position centrally of the spindle 10.

Within a slotted portion 58 of the spindle, we mount an arm 59 pivoted on the spindle at 60. The free end of the arm is normally held in a raised position by means of a spring 61 on a stud 61'. The arm may be forced downwardly against the action of the spring by means of a wedge 62 operating between rollers 63 and 64 secured to the spindle and arm respectively. Fluid pressure means as the cylinder 65 and piston 66 is preferably provided for operating the wedge. It will be noted that the cylinder and other parts in connection therewith are secured to the spindle gear 28.

The dot-and-dash line A represents the floor line. It will be noted that the spindle 10 extends above and below this line and its lower end is supported in the bearing 12. The large driving gear 28 and the means for operating the work holding-down mechanism are secured to the spindle directly below this line. The location of this mechanism below the floor permits the use of such mechanism of any desired size without in any way interfering with the operation of the machine.

What we claim is:

1. In combination with a rotary work support and driving dogs thereon, of an element extending axially within the work support, means on the element above the work support adapted to extend into a central bore in a work piece and to have operative engagement with such work piece, and means for drawing the element into the support whereby to hold the work piece in contact with the driving dogs.

2. In combination with a rotary work support and driving dogs thereon, of a shaft extending axially within the work support, means on one end of the shaft above the work support adapted to extend into a central bore in a work piece and to have operative engagement with such work piece, and fluid pressure operated means adjacent the other end of the shaft for drawing the shaft into the support whereby to hold the work piece in contact with the driving dogs.

3. In combination with a rotary work support and driving dogs thereon, of an element extending axially within the work support, means on the element above the work support adapted to engage the inner wall of a bore in a work piece, and means for drawing the element into the support whereby to hold the work piece in contact with the driving dogs.

4. In combination with a rotary work support and driving dogs thereon, of a shaft extending axially within the work support, means on one end of the shaft above the work support for engaging the inner wall of a bore in a work piece, and means adjacent the other end of the shaft for drawing the shaft into the support whereby to hold the work piece in contact with the driving dogs.

5. In combination with a rotary work support and driving dogs thereon, of a shaft extending axially within the work support, means on one end of the shaft above the work support for engaging the inner wall of a bore in a work piece, and fluid pressure means adjacent the other end of the shaft for drawing the shaft into the support whereby to hold the work piece in contact with the driving dogs.

6. In combination with a rotary work support and driving dogs thereon, of a shaft extending axially within the work support, means on the shaft above the work support and including a plurality of serrated jaws for engaging the inner wall of a bore in a work piece, and means adjacent the other end of the shaft for drawing the shaft into the support whereby to hold the work piece in contact with the driving dogs.

7. In combination with a rotary work support and driving dogs thereon, of a shaft extending axially within the work support, a plurality of serrated work-engaging jaws on the shaft above the work support, each jaw being seated on an inclined supporting surface, and means for drawing the shaft into the support whereby to hold the work piece in contact with the driving dogs, the said drawing movement of the shaft being adapted to slide the said inclined supporting surfaces relative to the jaws and thereby force the jaws into biting contact with the work.

8. In combination with a rotary work support and driving dogs thereon, of a shaft extending axially within the work support, means on the shaft above the work support and including a plurality of serrated jaws for engaging the inner wall of a bore in a work piece, and a wedge operated arm connected to the other end of the shaft for drawing the shaft into the support whereby to hold the work piece in contact with the driving dogs.

9. In combination with a rotary work support and driving dogs thereon, of a shaft extending axially within the work support, means on one end of the shaft above the work support for engaging a work piece, a pivoted arm operatively connected to the other end of the shaft, and a fluid pressure operated wedge for moving the arm and shaft in a direction to draw the work piece into driving engagement with the driving dogs.

10. A work securing device comprising the combination of a bushing and a plurality of serrated work engaging jaws mounted on the periphery thereof, the device being adapted to be mounted within the bore of a piece of work with the jaws engaging the wall of said bore.

11. A work securing device comprising the combination of a bushing and a plurality of serrated work engaging jaws slidably mounted on inclined surfaces on the periphery of the bushing, the device being adapted to be mounted within the bore of a piece of work with the jaws engaging the wall of said bore.

12. A work securing device comprising the combination of a bushing, a plurality of serrated work engaging jaws dovetailed for sliding movement on inclined surfaces on the periphery of the bushing, and means normally holding the jaws at the high portions of the inclined surfaces, the device being adapted to be mounted within the bore of a piece of work with the jaws engaging the wall of said bore.

13. A work securing device comprising a bushing with a plurality of serrated work engaging jaws mounted on the periphery thereof, in combination with a shaft adapted to receive the bushing thereover, the device being adapted to be mounted within the bore of a piece of work with the jaws engaging the wall of such bore and the device with a work piece thereon being adapted to be mounted on the shaft, and means adapted to be secured to the shaft over the bushing.

14. A work securing device comprising a bushing with a plurality of serrated work engaging jaws mounted on the periphery thereof, in combination with a shaft mounted in a work support and adapted to receive the bushing thereover, and interrupted screw threaded means for engaging the shaft over the bushing.

15. The combination of a work support rotatable about a vertical axis, a work securing shaft floatingly mounted at the rotary axis thereof, and resilient means for normally holding the shaft centered at such axis.

16. The combination of a work support rotatable about a vertical axis, a work securing shaft floatingly mounted at the rotary axis thereof, resilient means for normally holding the shaft centered at such axis, and means normally holding the shaft in a raised position.

17. The combination of a work support rotatable about a vertical axis, a work securing shaft floatingly mounted at the rotary axis thereof, means acting on the shaft to normally center the same at such axis, and counterbalance means surrounding the shaft and acting thereon to normally hold the shaft in a raised position.

18. The combination of a work support rotatable about a vertical axis, a work securing shaft floatingly mounted at the rotary axis thereof, a bushing secured within the work support about the shaft, and resilient means on the bushing for normally holding the shaft centered at the said rotary axis.

19. The combination of a work support rotatable about a vertical axis, a work securing shaft floatingly mounted at the rotary axis thereof, a bushing secured within the work support about the shaft, means on the bushing for normally holding the shaft centered at the said rotary axis, and a counterbalance weight supported by the bushing, surrounding the shaft and acting on the same to normally hold the shaft in a raised position.

20. The combination of a work support, a plurality of pivoted work centering devices relatively spaced about the center thereof and adapted to engage a work piece thereon, and means for simultaneously operating such devices about their pivots to center a piece of work on the support.

21. The combination of a work support, a plurality of pivoted work centering devices relatively spaced about the center thereof and adapted to engage a work piece thereon, and screw threaded means for simultaneously operating such devices about their pivots to center a piece of work on the support.

22. The combination of a work support, a plurality of pivoted work centering devices relatively spaced about the center thereof and adapted to engage a work piece thereon, screw threaded means for simultaneously operating such devices about their pivots to center a piece of work on the support, and means other than the rotation of the screw threaded means whereby the device may be adjusted radially of the work support to allow for different sized pieces of work.

23. The combination of a work support, a plurality of radially extending rods spaced about the center thereof, screw threaded means on each rod, a pivoted work centering device operatively connected to each screw threaded means, and means connecting the several rods for operating the screw threaded means simultaneously and moving the devices through equal distances to center a piece of work on the support.

24. The combination of a work support, a plurality of radially extending rods spaced about the center thereof, a screw threaded sleeve on each rod, a pivoted work centering device operatively connected to each sleeve, means connecting the several rods for rotating the sleeves simultaneously and moving the devices through equal distances to center a piece of work on the support, and means whereby the sleeves may be adjusted to different positions on the rods to allow for different sized pieces of work.

25. The combination of a work support, a plurality of radially extending screw threaded means spaced about the center thereof, each of said means comprising two relatively different sets of screw threads, a nut on each of said sets, a work centering device pivoted to each outer nut, a link connecting each device with the adjacent inner nut, and means connecting the several screw threaded means whereby rotation of one will rotate all such means and move the devices simultaneously and through equal distances to center a piece of work on the support.

26. The combination of a rotary work support, a plurality of driving dogs thereon, a plurality of work centering devices thereon adapted to engage the outer periphery of the work to center the same, and work engaging means extending axially within the support for drawing the work piece into tight engagement with the driving dogs.

27. The combination of a rotary work support, a plurality of driving dogs thereon, a plurality of work centering devices thereon arranged alternately of the driving dogs and adapted to engage the outer periphery of the work to center the same, a shaft extending axially within the support, means on one end of the shaft above the support for engaging the work piece, and means adjacent the other end of the shaft for drawing the shaft inwardly and the work downwardly into tight engagement with the driving dogs.

28. The combination of a rotary work support, a plurality of driving dogs thereon, a plurality of pivoted work centering devices thereon, means for simultaneously operating such devices about their pivots to center a piece of work on the support, a shaft extending axially within the support, means on one end of the shaft above the support for engaging within a central bore in a work piece on the support, and means adjacent the other end of the shaft for drawing the shaft inwardly and the work downwardly into tight engagement with the driving dogs.

29. A work holding and driving member comprising in combination, a block adapted to be mounted on a rotary work table, a serrated work driving jaw mounted on the block, a work holding jaw movably mounted in the block, and means for moving the holding jaw into engagement with the work on the table, the driving jaw being adapted to bite the surface of the work facing the table and the holding jaw being adapted to engage a relatively angular surface to hold the work against lateral movement.

30. A work holding and driving member comprising in combination, a block adapted to be mounted on a rotary work table, a serrated work driving jaw mounted on the block, a work holding jaw slidably mounted in the block, and means for sliding the holding jaw radially of the table into engagement with the work thereon, the driving jaw being adapted to bite the surface of the work facing the table and the holding jaw being adapted to engage a relatively angular surface to hold the work against lateral movement.

31. A work holding and driving member comprising in combination, a block adapted to be mounted on a rotary work table, a serrated work driving jaw mounted on the block, a work holding jaw movably mounted in the block relative to the driving jaw, and means for sliding the holding jaw radially of the table into engagement with the work thereon, the driving jaw being adapted to bite the surface of the work facing the table and the holding jaw being adapted to engage a relatively angular surface to hold the work against lateral movement.

32. A work holding and driving member comprising in combination, a block adapted to be mounted on a rotary work table, a serrated work driving jaw mounted on the block, a hook-shaped work holding jaw movably mounted in the block, and means for moving the holding jaw radially outward of the table into engagement with the work, the driving jaw being adapted to bite the surface of the work facing the table and the holding jaw being adapted to engage a relatively angular surface to hold the work against lateral movement.

33. A work holding and driving means comprising in combination, a rotary work table, a plurality of relatively spaced serrated work driving members thereon, means for engaging a work piece on the table, and power operated means acting on the work engaging means to draw and hold the work firmly seated against the work driving members.

34. A work holding and driving means comprising in combination, a rotary work table, a plurality of relatively spaced serrated work driving members thereon, means for engaging a work piece on the table, and power operated means extending upwardly through the center of the table and acting on the work engaging means to draw and hold the work firmly seated against the work driving members.

35. A work holding and driving means comprising in combination, a vertical spindle, a work table mounted on the upper end thereof, a plurality of relatively spaced work driving members thereon, and means extending axially through the spindle and adapted to operate on a work piece on the table to draw and hold the same firmly in contact with the work driving members.

36. A work holding and driving means comprising in combination, a vertical spindle, a work table mounted on the upper end thereof, a plurality of relatively spaced work driving members thereon, a rod extending through the spindle, work engaging means connected to the upper end of the rod, and power operated means at the lower end of the rod for drawing the rod and work engaging means downwardly to seat and hold the work in firm contact with the driving members.

37. A work holding and driving means comprising in combination, a rotary work table, a block mounted on the table, a serrated work driving jaw mounted on the block, a work holding jaw movably mounted in the block, means for moving the holding jaw into engagement with the work on the table, means for adjusting the block radially in the table, and power operated means for drawing and holding the work firmly seated against the driving jaws, the driving jaws being adapted to bite the surface of the work facing the table and the holding jaws being adapted to engage a relatively angular surface to hold the work against lateral movement.

In testimony whereof, we hereto affix our signatures.

LYNDON C. COLE.
JOHN J. FISHER.
DANIEL H. TEAS.